(12) United States Patent
Honda et al.

(10) Patent No.: US 8,629,998 B2
(45) Date of Patent: Jan. 14, 2014

(54) IMAGE FORMING APPARATUS AND IMAGE FORMING SYSTEM

(75) Inventors: Takashi Honda, Toyokawa (JP); Yasuhiro Ishihara, Toyohashi (JP); Kunio Furukawa, Toyokawa (JP); Masazumi Ito, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1098 days.

(21) Appl. No.: 12/013,027

(22) Filed: Jan. 11, 2008

(65) Prior Publication Data

US 2008/0192289 A1 Aug. 14, 2008

(30) Foreign Application Priority Data

Feb. 13, 2007 (JP) ................. 2007-032005

(51) Int. Cl.
*G06K 15/00* (2006.01)
(52) U.S. Cl.
USPC ............................ 358/1.14; 358/1.15; 358/1.5
(58) Field of Classification Search
USPC ................ 358/1.14, 1.15, 1.5; 380/25, 258
See application file for complete search history.

(56) References Cited

U.S. PATENT DOCUMENTS

| | | | | |
|---|---|---|---|---|
| 5,629,981 A | * | 5/1997 | Nerlikar ........................ 713/168 |
| 5,822,077 A | * | 10/1998 | Sasaki et al. ................. 358/296 |
| 6,570,557 B1 | * | 5/2003 | Westerman et al. .......... 345/173 |
| 2002/0089694 A1 | * | 7/2002 | Idehara ........................ 358/1.15 |
| 2003/0038965 A1 | * | 2/2003 | Simpson et al. .............. 358/1.15 |
| 2003/0152231 A1 | * | 8/2003 | Tomita et al. ................. 380/258 |
| 2004/0004735 A1 | * | 1/2004 | Oakeson et al. ............. 358/1.15 |
| 2004/0075860 A1 | * | 4/2004 | Shima et al. ................. 358/1.15 |
| 2004/0213615 A1 | * | 10/2004 | Nakao ............................. 400/76 |
| 2005/0024675 A1 | * | 2/2005 | Konno ........................ 358/1.15 |
| 2005/0264840 A1 | | 12/2005 | Niitsuma |
| 2006/0077417 A1 | * | 4/2006 | Nakata et al. ................ 358/1.14 |

FOREIGN PATENT DOCUMENTS

| | | | |
|---|---|---|---|
| JP | 8-262939 | | 10/1996 |
| JP | 2000-177212 | | 6/2000 |
| JP | 2002-321429 | | 11/2002 |
| JP | 2002321429 A | * | 11/2002 |
| JP | 2004-120088 | | 4/2004 |
| JP | 2004223990 A | * | 8/2004 |
| JP | 2005-342939 | | 12/2005 |
| JP | 2006-15624 | | 1/2006 |
| JP | 2007-25266 | | 2/2007 |

OTHER PUBLICATIONS

JP Office Action mailed Dec. 9, 2008 directed towards counterpart JP Application No. 2007-032005; 25 pages.

* cited by examiner

*Primary Examiner* — Allen H Nguyen
(74) *Attorney, Agent, or Firm* — Morrison & Foerster LLP

(57) ABSTRACT

If image stabilization becomes necessary while an MFP is executing a print job received from a user, the MFP performs the image stabilization while emitting an operation sound if the user has not moved away from the MFP. Also, if the user has moved away from the MFP, the MFP stops the print job and logs the user out.

7 Claims, 11 Drawing Sheets

IMAGE FORMATION SYSTEM 1

FIG.6

LOGIN NAME: USER X ☐ LOGOUT

REGISTERED DOCUMENT LIST

· DOCUMENT a***

· DOCUMENT b***

· DOCUMENT c***

· . . .

PLEASE SELECT DOCUMENT AND PRESS PRINT BUTTON

USER REGISTRATION INFORMATION 9

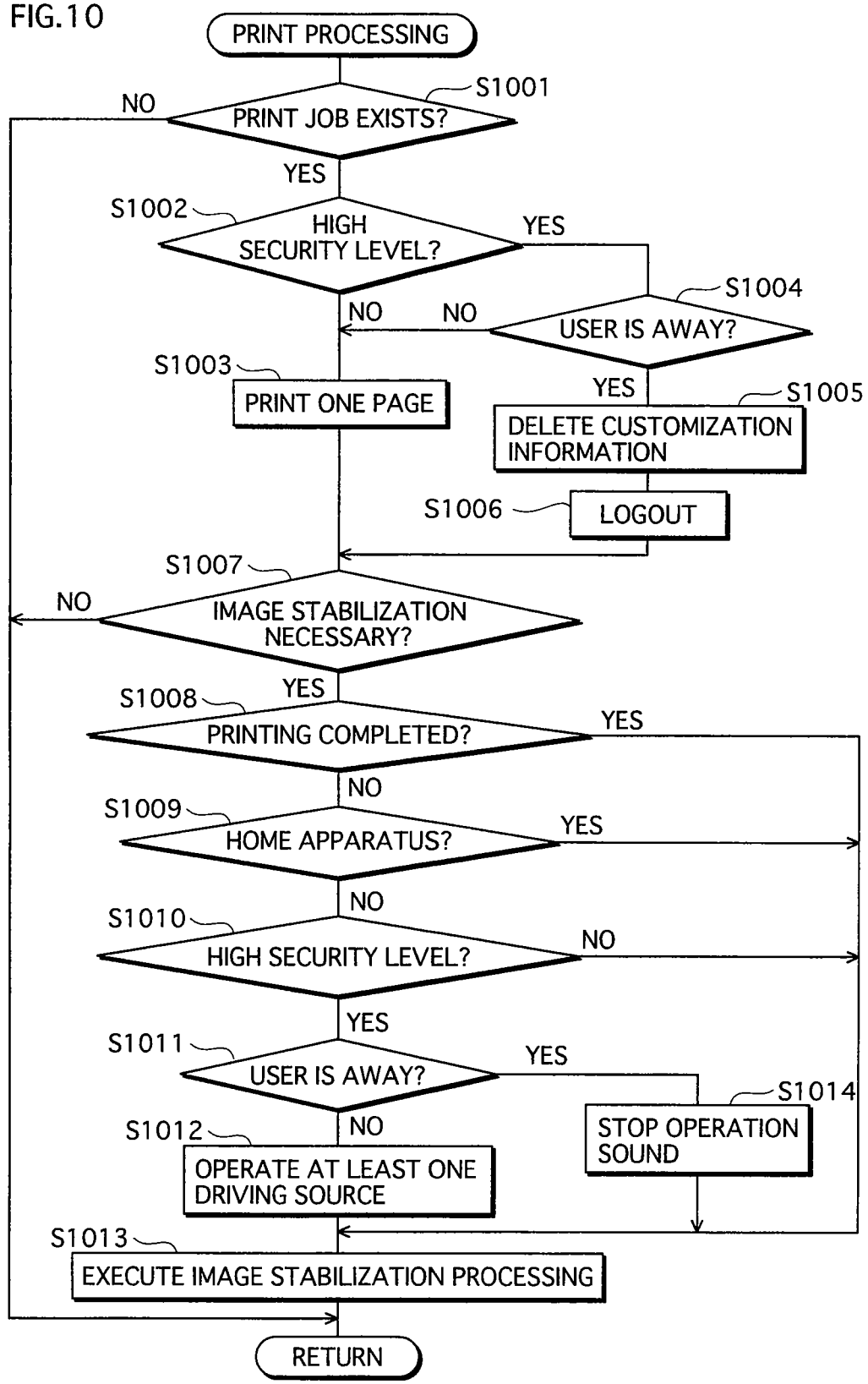

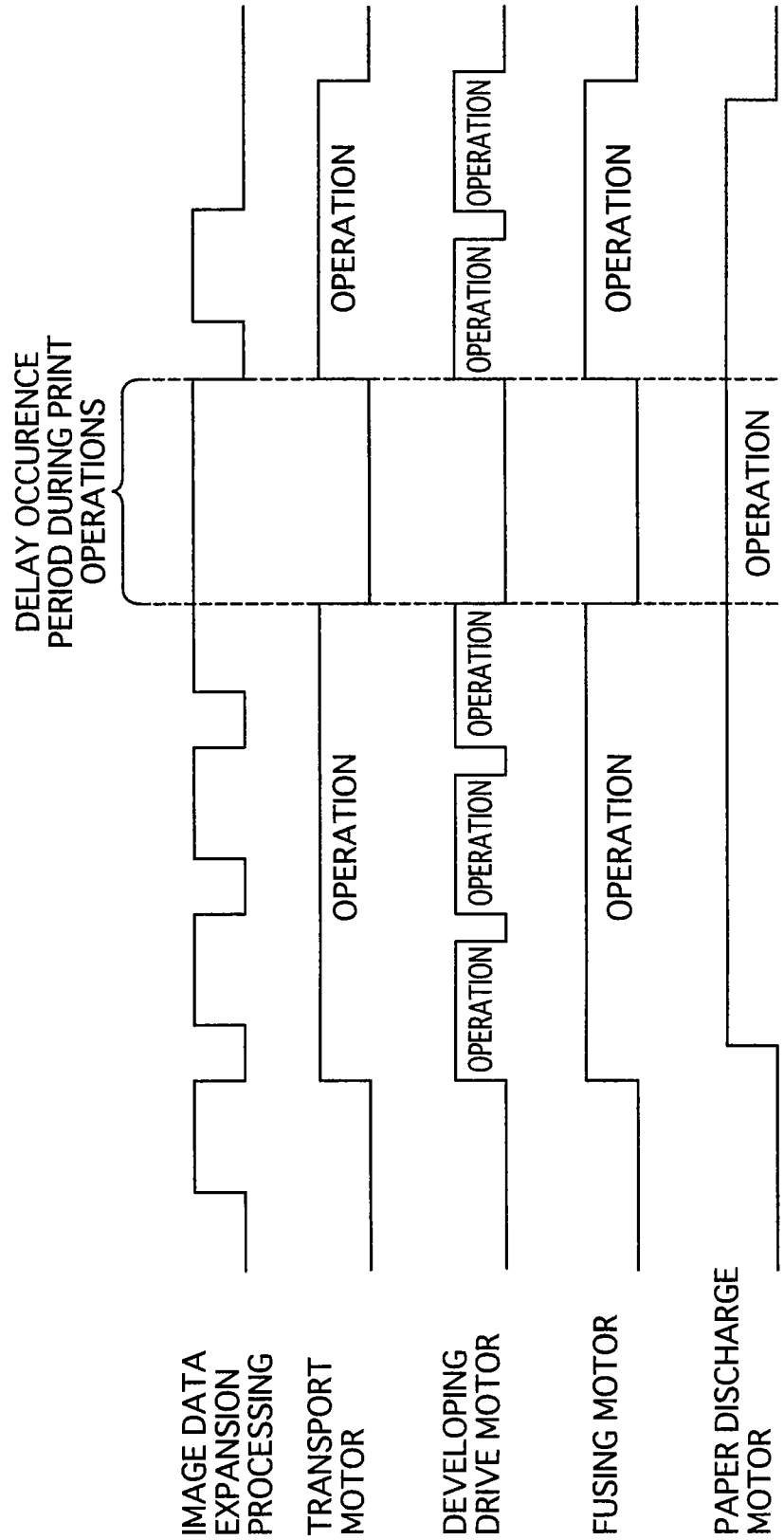

IMAGE FORMING APPARATUS AND IMAGE FORMING SYSTEM

CROSS-REFERENCE TO RELATED APPLICATIONS

This application is based on application No. 2007-32005 filed in Japan, the contents of which are hereby incorporated by reference.

BACKGROUND OF INVENTION

1. Field of the Invention

The present invention relates to an image forming apparatus and an image forming system that ensure user convenience while preventing leakage of confidential information accompanying print processing.

2. Related Art

In recent years, the use of network printers, which are image forming apparatuses that are connected to via a network, have become mainstream in offices, etc.

In such a case, it is not uncommon for a plurality of image forming apparatuses to be connected to the network. When an individual user tries to use a different image forming apparatus than usual, there are cases in which trouble must be taken to, for example, install a new driver on a personal computer, which is a detriment to user convenience.

For this reason, a technology is proposed that permits use of an image forming apparatus not normally used in a similar way to a normally used one, provided that the image forming apparatuses are connected to each other on the network.

Generally speaking, there is a trade-off between user convenience and network security. In the above conventional technology as well, while any image forming apparatus can be used, there is a risk of unexpected leakage of confidential content that has been printed.

One example of technology that prevents leakage of confidential information resulting from print output is a proposed technology for detecting that a user has moved away from the image forming apparatus during print processing, and stopping print output in that case. However, the general principle described above also applies to this technology, since user convenience is sacrificed.

SUMMARY OF INVENTION

The present invention has been achieved in view of the above problem, and an aim thereof is to provide an image forming apparatus and an image forming system that, in a case of a plurality of network-connected image forming apparatuses, prevent leakage of confidential information resulting from print processing, while ensuring user convenience.

In order to achieve the above aim, one aspect of the present invention is an image forming apparatus including a printer operable to execute a print job according to a request from a user, a home apparatus determiner operable to determine whether the image forming apparatus has been specified as a home apparatus of the user who requested execution of the print job, a presence determiner operable to determine whether the user who requested execution of the print job is in a vicinity of the image forming apparatus, and an execution controller operable to stop the execution of the print job if the home apparatus determiner has determined that the image forming apparatus has not been specified as the home apparatus of the user and the presence determiner has determined that the user is not in the vicinity of the image forming apparatus.

In this way, the print job is stopped when a determination is made that the user is not in the vicinity of the image forming apparatus in use only if the image formation in use has not been made the user's home apparatus. This prevents leakage of confidential information resulting from print output while the user is absent, and ensures user convenience.

Another aspect of the present invention is an image forming system including a plurality of image forming apparatuses, each of the image forming apparatuses including a printer operable to execute a print job according to a request from a user, a home apparatus determiner operable to determine whether the image forming apparatus has been specified as a home apparatus of the user who requested execution of the print job, a presence determiner operable to determine whether the user who requested execution of the print job is in a vicinity of the image forming apparatus, and an execution controller operable to stop the execution of the print job if the home apparatus determiner has determined that the image forming apparatus has not been specified as the home apparatus of the user and the presence determiner has determined that the user is not in the vicinity of the image forming apparatus. In this case as well, leakage of confidential information resulting from print output while the user is absent can be prevented, and user convenience can be ensured.

BRIEF DESCRIPTION OF DRAWINGS

These and other objects, advantages, and features of the invention will become apparent from the following description thereof taken in conjunction with the accompanying drawings, which illustrate a specific embodiment of the present invention.

In the drawings:

FIG. 6 shows an example of a list of unprocessed jobs displayed by the MFP 101 pertaining to the embodiment of the present invention;

FIG. 10 is a flowchart showing print processing pertaining to a variation (7) of the present invention; and FIG. 11 is a timing chart showing operations of driving sources in a case of an MFP pertaining to a variation (9) of the present invention executing image stabilization processing during printing operations.

DETAILED DESCRIPTION OF PREFERRED EMBODIMENTS

An embodiment of an image forming apparatus and image forming system pertaining to the present invention is described below with reference to the drawings.

1. Structure of the Image Forming System

The following describes the structure of the image forming system.

Figure 1:
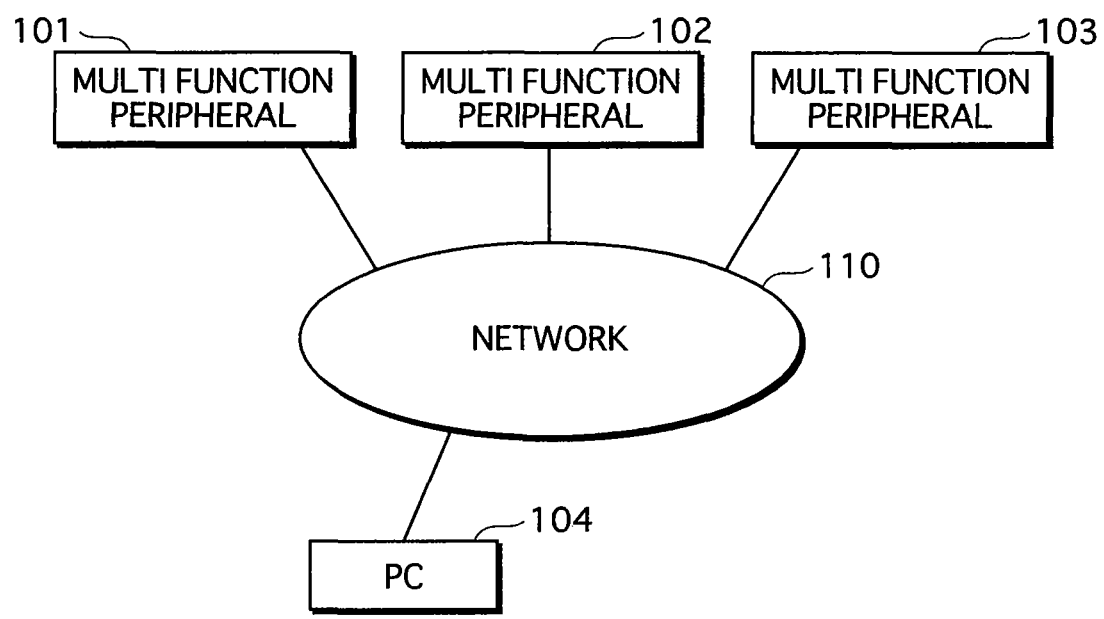
FIG. 1 shows a main structure of an image forming system according to the embodiment of the present invention.

As shown in FIG. 1, an image forming system 1 is constituted from MFPs (Multi Function Peripherals) 101 to 103 and a personal computer 104 that are interconnected via a network 110.

The personal computer 104 transmits text data and image data created with the use of application software etc. to any of the MFPs 101 to 103, causes print output thereof, and receives read image data from the MFPs 101 to 103.

A user of the image forming system 1 performs user registration with anyone of the MFPs 101 to 103. Hereinafter, the MFP with which user registration was performed will be referred to as the user's "home apparatus".

2. Structure of MFPs 101 to 103

Following is a description of the structure of the MFP 101. Descriptions of structures of the MFPs 102 and 103 have been omitted since they are similar to the structure of the MFP 101.

Figure 2:
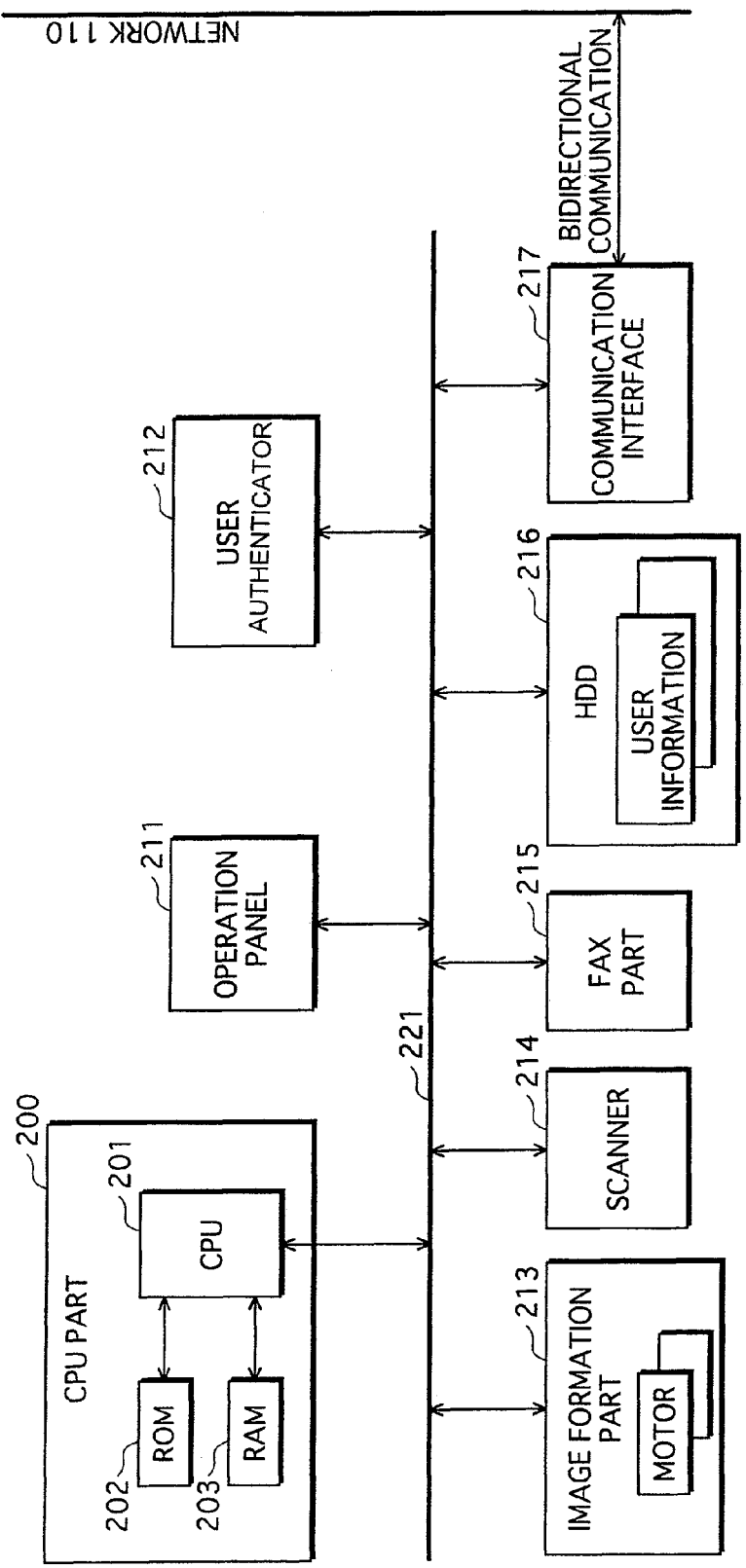
FIG. 2 is a block diagram showing an example of a main hardware structure of an MFP (Multi-Function Peripheral) 101 according to the embodiment of the present invention.

As shown in FIG. 2, the MFP 101 includes a CPU (Central Processing Unit) part 200, a operation panel 211, a user authenticator 212, an image formation part 213, a scanner 214, a fax part 215, an HDD (Hard Disk Drive) 216, and a communication interface (I/F) 217, all of which are connected together by an internal bus 221.

The CPU part 200 includes a CPU 201, a ROM (Read Only Memory) 202 and a RAM (Random Access Memory) 203. Programs executed by the CPU 201 or the like are recorded in the ROM 202.

The operation panel 211 includes a touch panel, keyboard, mouse or the like, and receives instructions from the user. The operation panel 211 also includes an LCD apparatus or an organic EL (Electro-Luminescence) display panel, etc., and displays various kinds of information.

The user authenticator 212 executes personal authentication for judging whether to permit the user of the MFP 101 to login.

The image formation part 213 is, for example, a laser printer or an inkjet printer, and prints images on a recording medium such as paper.

The scanner 214 includes a photoelectric conversion element such as a CCD (Charge Coupled Device), and reads a manuscript optically and outputs image data.

The fax part 215 transmits and receives image data via a PSTN (Public Switched Telephone Network) in accordance with facsimile standards.

The HDD 216 stores, for example, user information used by the user authenticator 212 in performing registration or reference, image data read by the scanner 214, and image data received via the fax part 215 or the communication I/F 217, etc., in a non-volatile manner.

The communication I/F 217 is an interface for communicating with another MFP or the personal computer 104 via the network 110.

Note that data input to the MFP 101 is performed by the reading of a manuscript by the scanner 214, the reception of input from another MFP or the personal computer 104 via the network 110, or the reception of facsimile data by the fax part 215. Also, data output from the MFP 101 is performed by print output by the image formation part 115, transmission to another MFP or the personal computer 104 via the network 110, or transmission of facsimile data by the fax part 215.

3. Operations of the MFPs 101 to 103

Following is a description of operations of the MFP 101. Descriptions of operations of the MFPs 102 and 103 have been omitted since they are similar to the operations of the MFP 101.

In a case of a plurality of MFPs, there is a tendency for each user to use a certain MFP, for example, the MFP closest to the seat of each user. In the present invention, the MFP that is expected to be used most frequently by a user is designated as the home apparatus of that user.

Also, users rarely use an MFP other than the home apparatus, so there is a greater possibility of confidential information being leaked when printed matter is left unattended than when the home apparatus is used.

For this reason, in a case of outputting printed matter from an MFP other than the home apparatus, the MFP keeps the user from moving away from the MFP by continuously emitting an operation sound, thereby preventing leakage of confidential information resulting from leaving the printed matter unattended.

3.1 Main Routine

Figure 3:
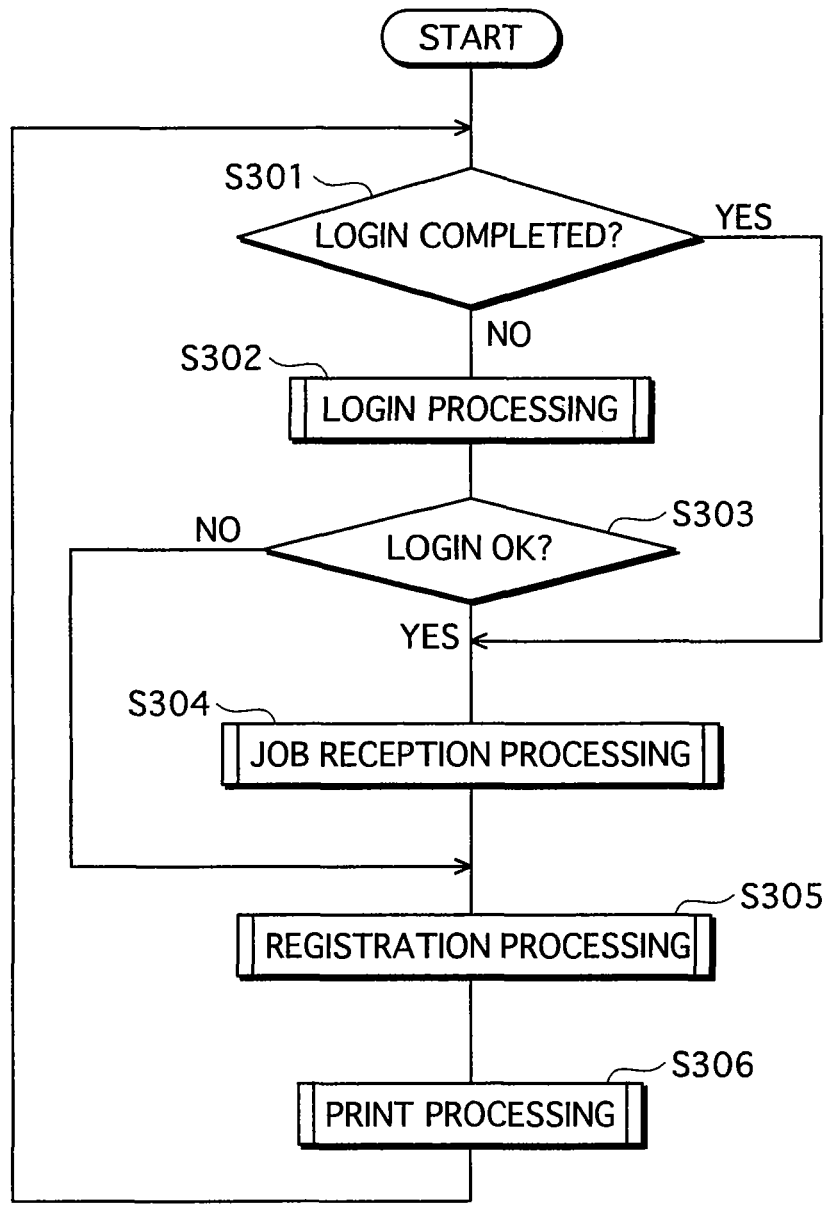
FIG. 3 is a flowchart showing main processing executed by the MFP 101 according to the embodiment of the present invention.

Following is a description of main processing executed by the MFP 101. As shown in FIG. 3, the MFP 101 first checks whether login has been completed, and if login has not been completed (S301:NO), login processing is executed (S302). Login processing is processing for authenticating the user and determining whether to permit login.

If login is permitted as a result of the determination (S303: YES) or login is completed (S301:YES), job reception processing is executed (S304). Job reception processing is processing for receiving various commands from the user of the MFP 101 via the operation panel 211. AS described above, the MFP 101 accepts commands only from a user who has been permitted to login.

If job reception processing has been executed or login has not been permitted (S303:NO), registration processing is executed (S305). Thereafter, print processing is executed (S306), and processing returns to step S301. Registration processing is processing for registering a new user of the MFP 101, and print processing is processing for executing a print job. Details of each type of processing are described later.

3.2 Login Processing (S302)

Figure 4:
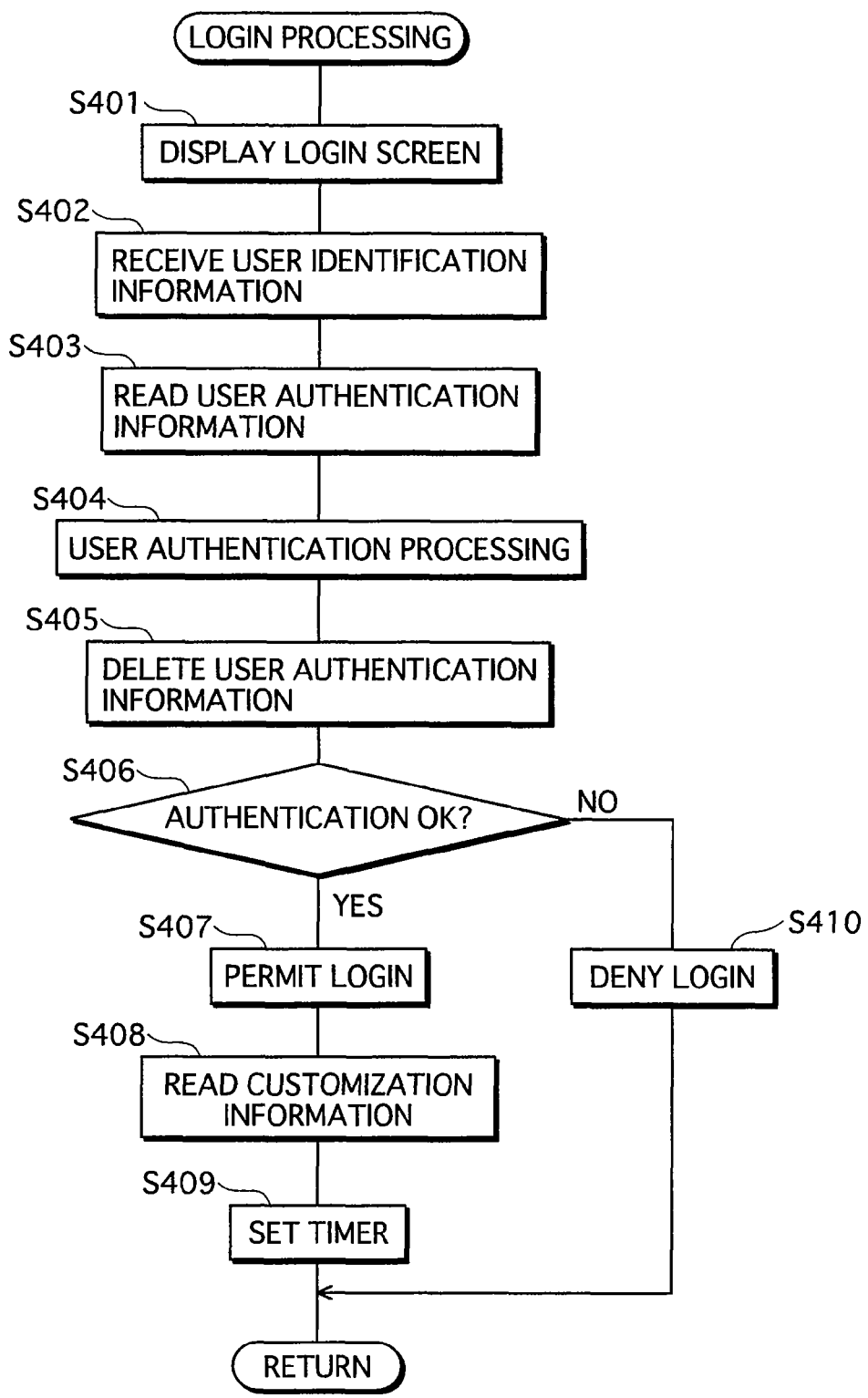
FIG. 4 is a flowchart showing login processing executed by the MFP 101 according to the embodiment of the present invention.

Following is a description of login processing. As shown in FIG. 4, the MFP 101 first displays a login screen (S401), and upon receiving user identification information (S402), reads user authentication information stored in the HDD 216 to the RAM 203 (S403). After executing user authentication processing for comparing the user identification information and the user authentication information (S404), the user authentication information is deleted from the RAM 203 (S405). This enables preventing leakage of user authentication information to a third party.

If user authentication succeeds (S406:YES), login is permitted, (S407), customization information pertaining to the user is read from the HDD 216 to the RAM 203 (S408), and a timer is set (S409). As is described later, the timer automatically logs out a user who has been away from the MFP 101 for a predetermined period of time, and is used to prevent a third party from making unauthorized use of the MFP 101 under the usage rights of the logged-in user.

If user authorization fails (S406:NO), login is denied (S410), and login processing ends.

3.3. Job Reception Processing (S304)

Following is a description of job reception processing.

Figure 5:
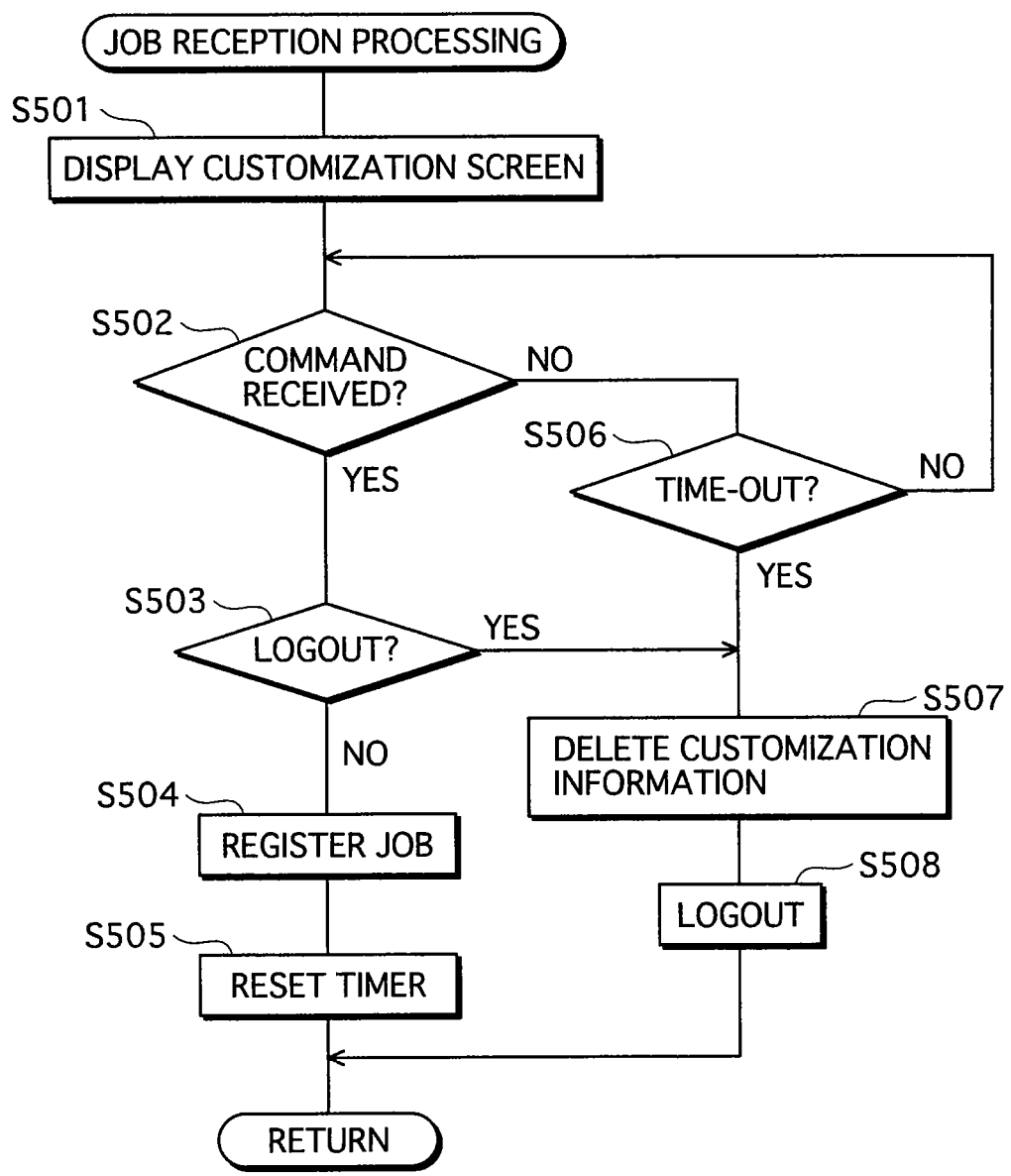
FIG. 5 is a flowchart showing job reception processing executed by the MFP 101 according to the embodiment of the present invention.

As shown in FIG. 5, the MFP 101 first displays a customization screen (S501) in accordance with the customization information read during login processing (S408). The customization screen may display, for example, a list of unprocessed jobs sent by the user, and a job that the user selects from the list may be executed.

For example, as shown in FIG. 6, a list of document names pertaining to unprocessed jobs is displayed, and when the user selects a document and presses the print button, the corresponding job is executed.

Next, upon receiving any type of command (S502:YES), the MFP 101 determines whether the received command is a logout command. In a case of receiving a command that is not a logout command (S503:NO), the MFP 101 registers a job according to the received command (S504), and after resetting the timer (S505), returns to the main routine.

In a case of receiving a command that is a logout command (S503:YES), the MFP 101 deletes the customization information from the RAM 203 (S507), and after logging out the user (S508), returns to the main routine.

If the MFP 101 did not receive a command (S502:NO), and a timeout occurs (S506:YES), the MFP 101 deletes customization information from the RAM 203 (S507), logs out the user (S508), and returns to the main routine. In other words, since there is a possibility that the user is away from the MFP 101 if a predetermined period of time passes without receiving a command, unauthorized input of a command by a third party is prevented by logging out the user.

If a timeout has not occurred (S506:NO), the MFP 101 waits for a command to be input.

3.4 Print Processing (S306)

Following is a description of print processing.

Figure 7:
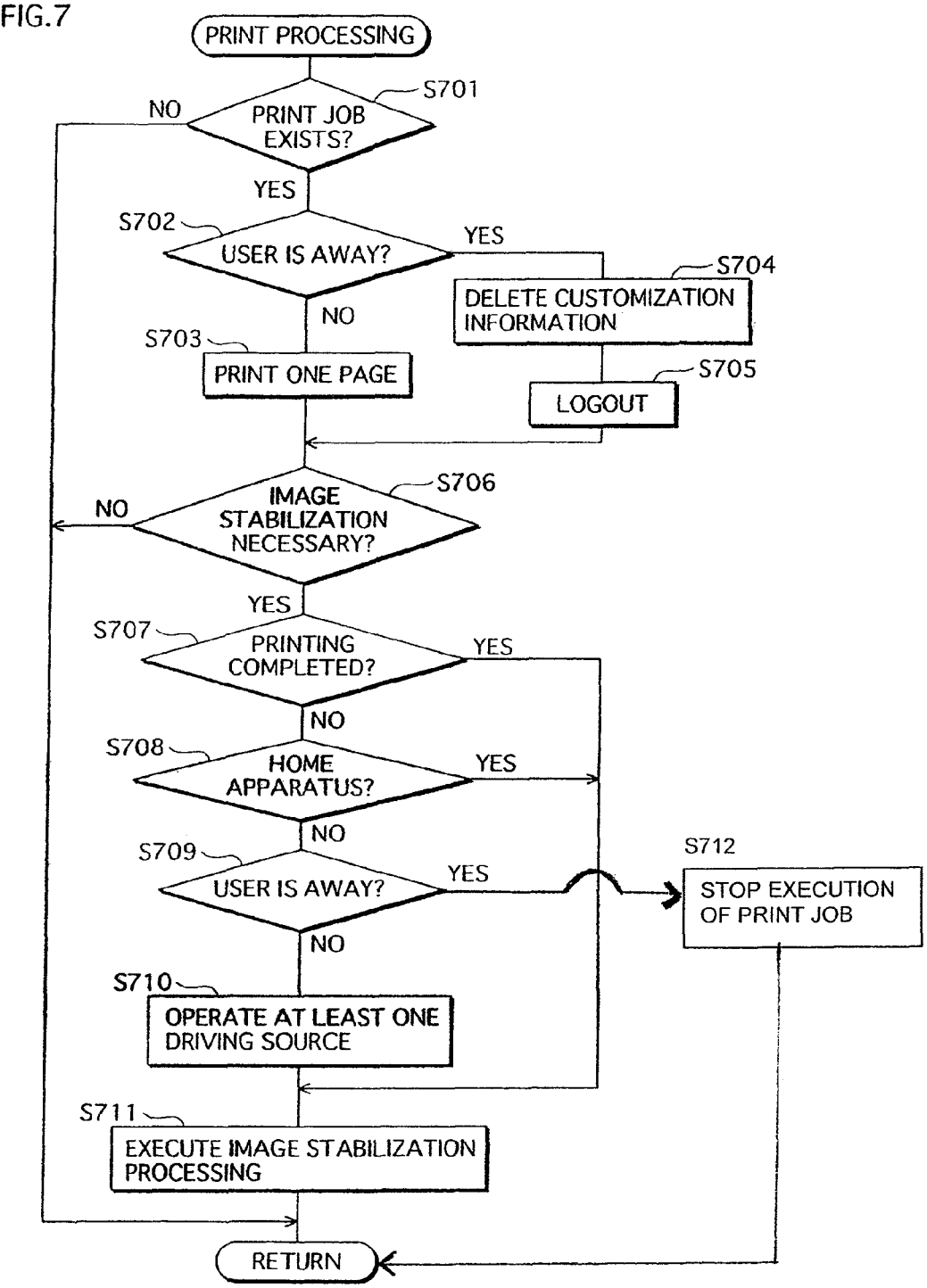
FIG. 7 is a flowchart showing print processing executed by the MFP 101 according to the embodiment of the present invention.

As shown in FIG. 7, first, the MFP 101 checks whether there is an unprocessed print job, and if the unprocessed print job exists (S701:YES), determines whether the user is away from the MFP 101. If the user is not away from the MFP 101 (S702:NO), the MFP 101 then prints out one page only (S703).

Also, if the user is away from the MFP 101 (S702:YES), the MFP 101 deletes the customization information from the RAM 203 (S704), and logs out the user (S705).

In this way, unauthorized use by a third party can be prevented in a case when the user, having forgotten to log out, moves away from the MFP. Incidentally, technology has been proposed for automatically logging out a user if no operation input is received in a predetermined period of time while logged in.

However, if this predetermined period of time is too long, unauthorized use by a third party cannot be adequately prevented, and if too short, a slight hesitation in inputting an operation command will cause the user to be logged off, resulting in a significant detriment to user-friendliness.

In contrast, user-friendliness can be improved, as described above, since if the MFP detects that the user is away and logs off, no interval is given for unauthorized use by a third party, and the user is not logged off unless the user is away.

Also, because print output is not performed if the user moves away from the MFP, this system prevents outcomes such as the user forgetting to pick up printed matter, or a third party seeing important printed matter, which might happen as a result of print output while the user is away from the MFP.

Next, after steps S703 and S705, the MFP judges whether image stabilization is necessary. If image stabilization is judged to be necessary (S706:YES), the MFP checks whether the print job has been completed.

If the print job has not been completed (S707:NO) the MFP 101 checks whether the home apparatus of the user who sent the print job has been designated as the MFP 101. If the MFP 101 has not been designated as the user's home apparatus (S708:NO), and the user is not away from the MFP 101 (S709:NO), the MFP 101 continuously emits the operation sound by operating at least one driving source (S710).

Conventionally, when stopping print processing and performing image stabilization processing or the like, the operation sound does not necessarily continue. For this reason, it is possible that the user will mistakenly believe that printing has finished, and after picking up only the printed pages and moving away from the MFP, the remaining pages of an important document may be seen by a third party, thereby leaking confidential information.

In this case, one measure against forgetting to take pages is providing a sensor in an output tray, and if paper remains after a predetermined period of time has passed after printing has been completed, a buzzer sound, or the like, will be generated. However, this is not a sufficient measure in view of security protection, since if the buzzer sounds after the user has moved away from the MFP, it is possible for the buzzer to alert a third party that the paper was forgotten.

In contrast, as described above, leakage of confidential information due to a third party seeing printed matter, etc., can be prevented in a case when the MFP is not the user's home apparatus, since the MFP keeps the user from moving away before print output is completed by notifying the user that the print output will continue.

If the print job has been completed (S707:YES), or the MFP 101 is the user's home apparatus (S708:YES) after step S710, the MFP 101 executes image stabilization processing (S711). If the user is away from the apparatus (S709:YES) print job execution is stopped (S712) and the MFP returns to the main routine. If no print job exists (S701:NO), if image stabilization is unnecessary (S706:NO), or if image stabilization has been executed, the MFP 101 returns to the main routine.

3.5. Registration Processing (S305)

Following is a description of registration processing.

Figure 8:
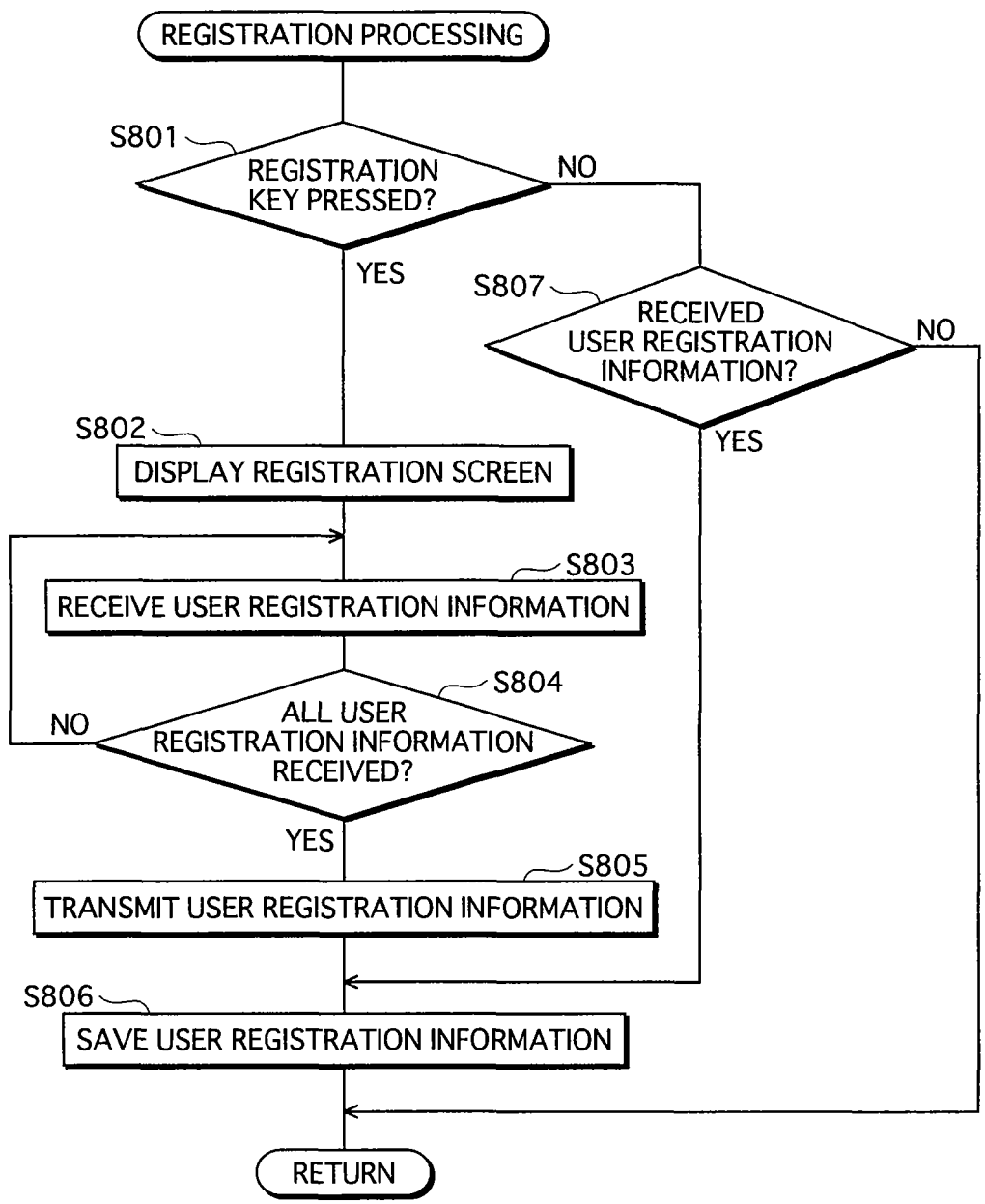
FIG. 8 is a flowchart showing registration processing executed by the MFP 101 according to the embodiment of the present invention.

As shown in FIG. 8, first, the MFP 101 checks whether a registration key has been pressed. If the registration key has been pressed (S801:YES), a registration screen is displayed on the operation panel 211 (S802). The registration screen shows the user items that are necessary to input, and the MFP 101 receives the user's input of user registration information (S803).

If there are items that have not been input (S804:NO), the MFP 101 continues to receive the user registration information (S803). When all of the user registration information has been received (S804:YES), the received user registration information is transmitted to other MFPs (S805) and saved to the HDD 216 (S806), and the MFP returns to the main routine.

In this case, a list of transmission destinations for the user registration information may be stored in the HDD 216 in advance, and the MFP 101 may transmit the user registration information with reference to this list.

If the registration key is not pressed (S801:NO), the MFP 101 checks whether the user registration information has been received from another MFP, and if not (S807:NO), returns directly to the main routine. If the user registration information has been received from the other MFP (S807:YES), the received user registration information is saved to the HDD 216 (S806), and the MFP 101 returns to the main routine. In this way, the MFPs 101 to 103 share the user registration information.

Figure 9:
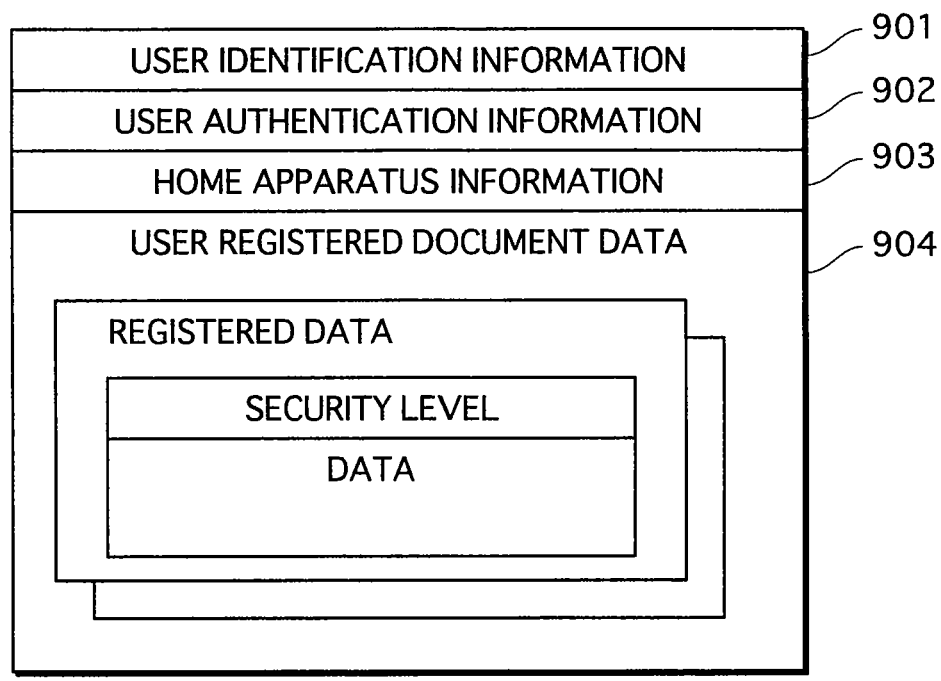
FIG. 9 shows an example of a data structure of user registration information stored by the MFP 101 according to the embodiment of the present invention.

For example, as shown in FIG. 9, user registration information 9 is composed of user identification information 901, user authentication information 902, home apparatus information 903, and user registered document data 904.

As described above, the user identification information 901 is information for identifying the user, and is the user's name, an ID code, or the like.

The user authentication information 902 is information for preventing others from acquiring, without permission, a job sent by the user, and may be ID card information, wireless tag information, etc. Also, features for biometric authentication (fingerprint verification, face verification, etc.) may be used.

The home apparatus information 903 specifies which one of the MFPs 101 to 103 is the terminal where the user registration information is registered, and may be, for example, an IP address or a host name. It is desirable for an MFP that is likely to be used most frequently by the user to be designated as the user's home apparatus. A plurality of MFPs may be registered in the home apparatus information 903, or no MFPs at all may be registered.

The user registered document data 904 includes registered data pertaining to jobs sent by the user to the MFPs 101 to 103. The registered data includes a document security level and main data (document data, image data, and the like). The security level is referred to when the data is read, and is added by the user when sending the job to indicate the degree of importance and confidentiality of the data.

4. Variations

Although described based on the above embodiment, the present invention is of course not limited to this, and variations such as the ones below can also be implemented.

(1) Although not specifically referred to in the above embodiment, the network 110 may be a LAN (Local Area Network), or may be a WAN (Wide Area Network) or the Internet. Also, the form of connection may be wired or wireless.

(2) In the above embodiment, all of the MFPs send the user registration information to each other, and all of the MFPs hold the same user registration information, but the present invention is of course not limited to this, and the following variations can also be implemented.

For example, the user registration information may be sent to a shared memory, stored there, and read from the shared memory when necessary. Also, instead of an MFP sending the user registration information to other MFPs when a user registers, an MFP that does not hold the user registration information for a user who attempts to login may acquire the user registration information by making an inquiry to other MFPs.

(3) Although not specifically referred to in the above embodiment, the following variations may be used when printing a document or image data created on the personal computer 104.

Specifically, when printing image data or documents created on the personal computer 104, the image forming system 1 may be designated as the output destination. In this case, for example, the user is logged into an MFP that is not the home apparatus, the document or image data is sent to the user's home apparatus, and the MFP makes an inquiry to the home apparatus of that user regarding the existence of any unprocessed jobs. A list of unprocessed jobs may be displayed on the operation panel 211, and a job to be processed may be selected.

Also, similar processing may be performed for image data read by the scanner 214 and image data received by the fax part 215. Specifically, the image data is saved to the HDD 216. When a user logs into one of the MFPs, the MFP makes an inquiry to other MFPs regarding the existence of image data. A list of image data may be displayed on the operation panel 211, and image data to be processed may be selected.

(4) Although not specifically referred to in the above embodiment, features extracted from biometric information such as fingerprints, voiceprints, or iris scans may be used as authentication information. Also, a login name and a password may be received and authorized.

(5) Although not specifically referred to in the above embodiment, if a displayed customization screen includes a button whose function is not supported by the MFP in use, the fact that the unsupported function cannot be selected may be displayed in a way that the user can understand, for example, by displaying the button in a lighter shade than other buttons, etc.

(6) Although not specifically referred to in the above embodiment, in print processing (S306), the MFP may, for example, determine whether the user is away from the MFP in the following way.

Specifically, the MFP is provided with an ID card reader, and a different ID card is assigned to each user. Each ID card stores a different ID number unique to each user, and the MFP stores the ID numbers of the users as user registered data. The MFP may continuously and repeatedly access the ID card in the ID card reader, and determine that the user is not away from the MFP if the ID card storing the user's ID number is inserted into the ID card reader. The MFP may determine that the user is away from the MFP if the ID card has been removed from the ID card reader, or the ID number stored on the card is different from the ID number of the user.

Similarly, the MFP may be provided with a wireless tag reader, and a wireless tag (RFID: Radio Frequency Identification) storing a unique ID number may be assigned to each user, and the MFP may continuously and repeatedly access the wireless tag by the wireless tag reader. If the wireless tag that stores the ID number of the user is within a zone where communication is possible, the MFP determines that the user is not away from the MFP, and if the wireless tag is not in the zone where communication is possible, or if the ID number stored on the wireless tag is different from the ID number of the user, the MFP may determine that the user is away from the MFP.

Also, the MFP may be provided with a fingerprint reader, and a set of fingerprint features may be stored as user registration information for each user. If the set of fingerprint features placed on the fingerprint reader matches the set of fingerprint features of the user who is logged in, the MFP determines that the user is not away, and if the set of fingerprint features of the finger placed on the fingerprint reader does not match the set of fingerprint features of the user who is logged in, or if the finger is not placed on the fingerprint reader, the MFP determines that the user is away.

Also, an infrared sensor may be used to detect the user. Specifically, infrared rays may be radiated from a front surface of the MFP toward a standing position of the user. The MFP may continually and repeatedly determine the user's presence or absence according to whether the reflected rays are being received.

(7) Although not specifically referred to in the above embodiment, when executing a print job composed of a plurality of pages, there are instances when the security level to be maintained differs from page to page. In such cases, the following processing may be performed.

First, when a user is sending a print job, the MFP receives input of a security level for each page. Thereafter, in print processing (S306), different processing is executed depending on the security level of each page.

Specifically, as shown in FIG. 10, when there are unprocessed print jobs (S1001:YES), and the security level of a page to be printed is high (S1002:YES), the MFP checks whether the user is away from the MFP. If the user is away from the MFP (S1004:YES), the MFP deletes the customization information from the ROM (S1005) and logs the user out (S1006).

When the security level of a page to be printed is not high (S1002:NO), or the security level is high, but the user is not away from the MFP (S1004:NO), the page is printed (S1003). According to this processing, pages with a high security level are protected, and pages with a low security level are printed immediately, thereby maintaining security as a whole while enabling high-speed printing to be realized.

Next, the MFP 101 checks whether image stabilization processing is necessary. If image stabilization processing is necessary (S1007:YES), the MFP 101 checks whether the print processing has been completed. If the print processing has not been completed (S1008:NO), and the MFP 101 is not the home apparatus (S1009:NO), the MFP 101 refers to the security level of the page currently being printed.

If the security level of the page currently being printed is high (S1010:YES), the MFP 101 checks whether the user is away from the MFP. If the user is not away (S1011:NO), the MFP continues emitting the operation sound to notify the user that print processing is continuing (S1012).

In a case when the user is away from the MFP (S1011: YES), the sound of operation is stopped, thereby making it difficult for a third party to know that print processing is continuing in the absence of the user (S1014).

Note that in a print job, page order does not necessarily coincide with the security level of each page. For this reason, for example, in a case when fingerprint authorization is used to determine the presence or absence of the user, the timing of when a finger should be placed on the fingerprint reader may not necessarily be sequential, thereby complicating user operation.

In response to this kind of problem, the order of pages to be printed may be changed before the print job is executed so that pages having a high security level are printed with priority. The authorization process is performed sequentially and user operation is made less complicated, thereby improving user convenience.

If the pages are printed in order from the lowest security level, in a case when the user temporarily moves away from the apparatus before authorization is necessary and fails to return in time, processing for security protection such as automatic logout is necessary. However, in such a situation, when there is automatic logout, the user must send the print job again, thereby complicating user operation. For this reason as well, ordering pages to start from the highest security level is desirable.

(8) Although, in the embodiment, a case is described in which security is maintained by changing processing according to whether the MFP in use is the home apparatus, the present invention is of course not limited to this, and the following variations are also possible.

Specifically, in a case in which an MFP other than the home apparatus protects the same level of security as the home apparatus, it is desirable to simplify user operation by omitting the user presence check.

For this reason, for example, a security level pertaining to each MFP may be registered in the user registration information, and when print processing is executed, whether the user presence check is necessary may be determined by referencing the security level.

Note that in a case when print processing is performed by an MFP other than the home apparatus that can maintain a high security level and the user presence check is not performed, identifying the user who sent the printed matter could be difficult if the user forgets to pick up the printed matter.

In a case when an MFP that is not the home apparatus executes print processing, the above problem can be solved by printing the user's name or another piece of information identifying the user on a blank portion of the paper.

(9) Although in the embodiment, a case is described in which an operation sound is generated by at least one driving source so that the user will not move away from the MFP while a print job is being executed, the present invention is of course not limited to this. The operation sound may be produced from a plurality of driving sources. Also, the driving sources may be, for example, a transport motor, a developing drive motor, a fusing motor, and a paper discharge motor.

In this case, using the driving source that consumes the least electricity is preferred. Also, using an operation mode that consumes the least electricity is preferred, provided that a sufficient operation sound can be obtained.

Following is one example of operating driving sources in a case of executing image stabilization during printing operations. FIG. 11 shows delay occurrence periods during printing operations, which are periods during which print processing is delayed due to image stabilization processing, etc. As shown in FIG. 11, image data expansion processing is performed for each page, and the transport motor, the developing motor, the fusing motor, and the paper discharge motor are driven accordingly.

When a delay in printing operations occurs, driving sources that are not needed during the delay period, such as the transport motor, the developing drive motor, and the fusing motor are stopped, whereas the paper discharge motor continues to operate and emit the operation sound. This makes the user aware that the print job has not been completed, thereby preventing the user from moving away from the MFP.

Alternatively, the user may be notified that the print job has been completed by emitting a buzzer sound or the like. This prevents the user from moving away from the MFP while the print job is being executed, since the print job is still being executed until the buzzer sound is emitted.

(10) Although the above embodiment describes a case in which the operation sound is generated during image stabilization processing while the print job is being executed, the present invention is, of course, not limited to this. While executing jobs other than print jobs or processing other than image stabilization, the operation sound may be generated to notify the user that the job has not been completed. For example, the sound of operation may similarly be generated while executing processing for reading a manuscript.

5. Summary

The following describes the main points of the above embodiment.

First, the image forming apparatus may further include a use permitter operable to permit use of the image forming apparatus according to a request from the user, and a revoker operable to revoke permission to use the image forming apparatus if the home apparatus determiner has determined that the image forming apparatus whose use has been permitted has not been specified as the home apparatus of the user and the presence determiner has determined that the user is not in the vicinity of the image forming apparatus. According to this structure, leakage of confidential information resulting from unauthorized use by a third party under the usage rights of an absent user can be prevented.

Also, the image forming apparatus may further include a security level receiver operable to receive a security level designation for each of one or more pages of print data pertaining to the print job, and a prohibiter operable to prohibit, depending on the security level of the page to be printed, the execution controller from stopping the execution of the print job, wherein the printer executes the print job by printing each page having a higher security level with priority. In this case, in the image forming apparatus, the prohibiter may prohibit the execution controller from stopping the execution of the print job when the page of the print data to be printed has a lower security level. According to this structure, since pages having a higher level of confidentiality are printed together first and pages having a lower level of confidentiality are printed later, high-speed printing can be realized while ensuring user convenience.

Also, the image forming apparatus may further include a reader operable to read user identification information from a user identification information storage apparatus, and the presence determiner may determine that the user is in the vicinity of the present apparatus only if a user pertaining to the user identification information read by the reader matches the user who made the request. In this case, in the image forming apparatus, the reader may be an ID card reader and the user identification information storage apparatus may be an ID card, or the reader may be a wireless tag reader and the user identification information storage apparatus may be a wireless tag. Alternatively, the image forming apparatus may further include a biometric identifier operable to identify a user by biometric identification, and the presence determiner may determine that the user is in the vicinity of the present apparatus only if a user identified by the biometric identifier matches the user who made the request, and by using any of these structures, the presence or absence of the user can be determined.

Also, the image forming apparatus may further include a cancel setting receiver operable to receive a cancel setting that designates whether a cancel is necessary, and a canceller operable to maintain the use permission of the image processing apparatus and prevent stopping the execution of the print job if the cancel setting receiver has received the cancel setting designating that the cancel is necessary, regardless of whether the presence determiner has determined that the user who made the request is not in the vicinity. According to this structure, excessive security measures do not need to be performed in an image forming apparatus other than the home apparatus, as long as the other image forming apparatus maintains the same level of security as the home apparatus, thereby improving user convenience.

In this case, the image forming apparatus may further include a user information printer operable to, if printing is being performed and the presence determiner has determined that the user is not in the vicinity of the image forming apparatus, additionally print information pertaining to the user. This structure facilitates delivery of printed material to an absent user, which is preferable.

Also, the image forming apparatus may further include a notifier operable to notify, by an operation sound of the image forming apparatus, that the print job has not been completed, if the home apparatus determiner has determined that the image forming apparatus has not been specified as the home apparatus of the user, and furthermore the execution of the print job has been stopped and another job is being executed. According to this structure, continuing the operation sound notifies the user that a print job has not been completed, which prevents the user from moving away from the image forming apparatus. This prevents the user from forgetting to pick up the printed matter and leakage of confidential information resulting from forgotten printed matter being seen by a third party.

In this situation, in the image forming apparatus, the notifier may perform the notification by generating the operation sound with use of, from among a plurality of driving sources of the image processing apparatus, a driving source that consumes a least amount of power. Also, in the image forming apparatus, the another job may be image stabilization processing, or the another job may be manuscript reading processing.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming apparatus comprising:
    a printer operable to execute a print job according to a request from a user;
    a security level receiver operable to receive a security level designation for each of one or more pages of print data pertaining to the print job;
    a presence determiner operable to determine whether the user who requested execution of the print job is in a vicinity of the image forming apparatus;
    an execution controller operable to stop the execution of the print job, including stopping printing received print data of a print job, after printing of the print job has started if the presence determiner has determined that the user is not in the vicinity of the image forming apparatus; and
    a prohibiter operable to prohibit, depending on the security level of the page of the print data to be printed, the execution controller from stopping the execution of the print job, wherein
    the printer executes the print job by printing each page having a higher security level with priority.

2. The image forming apparatus of claim 1, further comprising:
    a use permitter operable to permit use of the image forming apparatus according to the request from the user; and
    a revoker operable to revoke the permission to use the image forming apparatus if the home apparatus determiner has determined that the image forming apparatus has not been specified as the home apparatus of the user who has been permitted use and the presence determiner has determined that the user is not in the vicinity of the image forming apparatus.

3. The image forming apparatus of claim 2, further comprising:
    a cancel setting receiver operable to receive a cancel setting that designates whether a cancel is necessary; and
    a canceller operable to maintain the use permission of the image processing apparatus and prevent stopping the execution of the print job if the cancel setting receiver has received the cancel setting designating that the cancel is necessary, regardless of whether the presence determiner has determined that the user who made the request is not in the vicinity.

4. The image forming apparatus of claim 1, further comprising:
    a reader operable to read user identification information from a user identification information storage apparatus, wherein the presence determiner determines that the user is in the vicinity of the present apparatus only if a user pertaining to the user identification information read by the reader matches the user who made the request.

5. The image forming apparatus of claim 4, wherein the reader is an ID card reader and the user identification information storage apparatus is an ID card, or the reader is a wireless tag reader and the user identification information storage apparatus is a wireless tag.

6. The image forming apparatus of claim 1, further comprising:

a biometric identifier operable to identify a user by biometric identification, wherein the presence determiner determines that the user is in the vicinity of the present apparatus only if a user identified by the biometric identifier matches the user who made the request.

7. An image forming apparatus comprising:

a printer operable to execute a print job according to a request from a user;

a home apparatus determiner operable to determine whether the image forming apparatus has been specified as a home apparatus of the user who requested execution of the print job;

a presence determiner operable to determine whether the user who requested execution of the print job is in a vicinity of the image forming apparatus;

an execution controller operable to stop the execution of the print job, including stopping printing received print data of a print job after printing of the print job has started if the presence determiner has determined that the user is not in the vicinity of the image forming apparatus, wherein the execution controller causes the image forming apparatus to emit an operation sound when the execution of the print job has not been completed and has stopped after printing of the print job has started, and the home apparatus determiner has determined that the image forming apparatus has not been specified as the home apparatus of the user;

a use permitter operable to permit use of the image forming apparatus according to the request from the user;

a revoker operable to revoke the permission to use the image forming apparatus if the home apparatus determiner has determined that the image forming apparatus has not been specified as the home apparatus of the user who has been permitted use and the presence determiner has determined that the user is not in the vicinity of the image forming apparatus;

a cancel setting receiver operable to receive a cancel setting that designates whether a cancel is necessary;

a canceller operable to maintain the use permission of the image processing apparatus and prevent stopping the execution of the print job if the cancel setting receiver has received the cancel setting designating that the cancel is necessary, regardless of whether the presence determiner has determined that the user who made the request is not in the vicinity; and a user information printer operable to, if printing is being performed and the presence determiner has determined that the user is not in the vicinity of the image forming apparatus, additionally print information pertaining to the user.

* * * * *